UNITED STATES PATENT OFFICE.

WILHELM BECKERS, OF NEW YORK, N. Y.

ORGANIC ACID MORDANT AND PROCESS OF MAKING SAME.

SPECIFICATION forming part of Letters Patent No. 719,555, dated February 3, 1903.

Application filed June 4, 1902. Serial No. 110,201. (No specimens.)

*To all whom it may concern:*

Be it known that I, WILHELM BECKERS, doctor of philosophy, chemist, residing in New York city, State of New York, have invented a new and useful Improvement in Organic Acid Compounds and Processes of Manufacturing the Same, of which the following is a specification.

In treating vegetables, such as cabbage, beans, &c., with salt for the purpose of pickling them, employing about one-half to one per cent. of the weight of the vegetable, the comminuted material is subjected to such pressure that of the ninety to ninety-two per cent. of liquid contained in the vegetable about fifty per cent. is gradually drawn off. The liquid thus obtained contains, besides the water-soluble constituents of the vegetables employed for pickling, the water-soluble products formed by the process of fermentation which accompanies the ripening process of the vegetables. The chemical composition of the liquid is rather complex. Besides the phosphates, lime salts, &c., and varieties of sugar originally present in the vegetables it contains organic acids—such as lactic, butyric, acetic, and formic acid in their free state—and esters of these acids formed during the fermentation process of the vegetables. The presence of these bodies makes the liquid of great value as a reducing agent of the mordants used for dyeing wool, &c., for which purposes hitherto such compounds as lactic acid, cream of tartar, &c., have been used. The liquid is also used with great advantage in tanning hides or skins to replace such acids as lactic acid in the deliming, drenching, swelling, plumping process and as a reducing agent in the chrome tannage of hides and skins.

The peculiar effect of this new compound when employed in the arts as described above is probably due to the gradual decomposition of the esters and the generation of free acids, which in their nascent state exercise remarkable reducing powers, and thus while sufficient acid is always present for the reaction there is at no stage of the reaction an excess of acid present.

In order to carry out my process, I may proceed as follows: Vegetables, such as cabbage, beans, &c., are treated with about one-half to one per cent. of salt, which is placed between the layers of the vegetables. The vegetable is then subjected to such pressure that of the ninety to ninety-two per cent. of liquid contained in the vegetable about fifty per cent. is gradually drawn off. The liquid thus obtained is evaporated in an open kettle or otherwise until it shows a specific gravity of about 20° to 30° Baumé. It is then filtered in order to remove the precipitated vegetable matter, such as albuminoids, &c. The liquid is then ready for use, or it may be further treated with so much sulfuric acid that the liquid when tested with Congo paper shows the presence of slight traces of mineral acid.

Having thus described my invention, and in what manner the same is to be performed, what I claim as new, and desire to secure by Letters Patent, is—

1. The herein-described process for the preparation of a new organic acid compound consisting in collecting the liquid gradually drawn from vegetables by pressure in the pickling process with salt, concentrating the same and removing the precipitated vegetable matter by filtration, substantially as herein described.

2. The herein-described reducing liquid derived from waste-salt pickle by evaporation and removal of the precipitated impurities which is an acid liquid of a specific gravity of 20° to 30° Baumé, free from albuminoids and adapted for use in dyeing, tanning, &c., substantially as described.

In testimony whereof I have signed my name in the presence of two subscribing witnesses.

WILHELM BECKERS.

Witnesses:
 JAMES DETTMANN,
 CHAS. C. YOUNG.